INVENTORS
ALBERT R. DE FLORIO
DONALD WORTZMAN

BY Edward S. Berkery
ATTORNEY

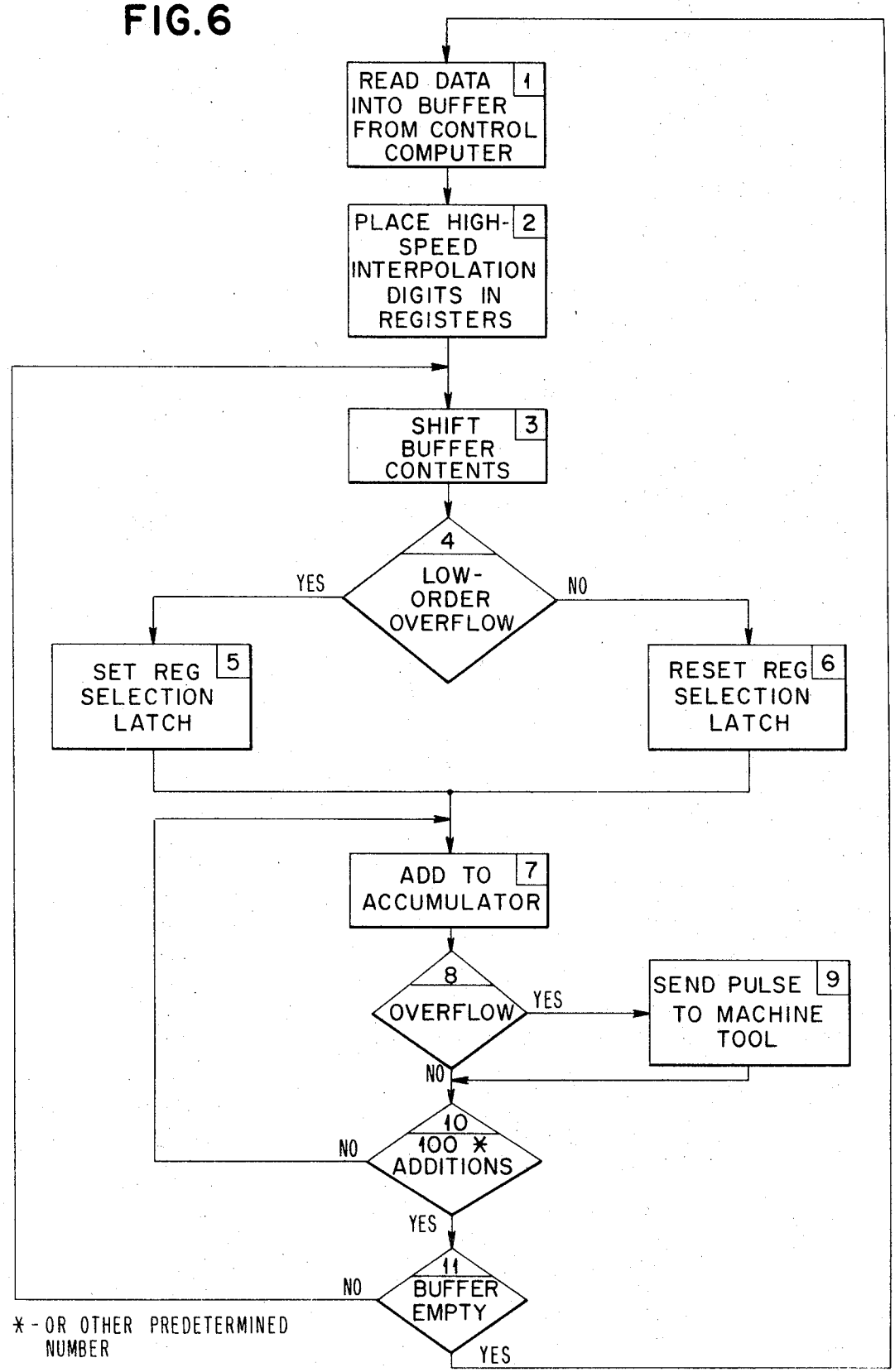

United States Patent Office 3,564,595
Patented Feb. 16, 1971

3,564,595
DATA INTERPOLATION FOR COMPUTER CONTROL OF MACHINE TOOLS
Albert R. De Florio, Philadelphia, Pa., and Donald Wortzman, Mahopac, N.Y., assignors to International Business Machines Corporation, Armonk, N.Y., a corporation of New York
Filed Nov. 19, 1968, Ser. No. 776,948
Int. Cl. G08c 19/20; H03k 3/78
U.S. Cl. 235—151.11                                   7 Claims

ABSTRACT OF THE DISCLOSURE

A system for interpolating data so as to generate a stream of pulses for controlling a machine tool or other precise mechanism. The interpolation is broken into a high-speed portion and a low-speed portion. The low-speed portion is performed by a general purpose computer and the high-speed portion is performed by a special purpose interpolator.

INTRODUCTION

This invention relates to the control of machine tools or other precise mechanisms in general and, more particularly, to a system for interpolating data so as to generate a pulse stream for controlling a machine tool or multiple machine tools in a real time mode.

DESCRIPTION OF PRIOR ART

Numerically controlled machine tools are positioned by a mechanism which responds to pulses supplied to it. Each pulse represents a small increment of movement on the order of a fraction of an inch. The number of pulses supplied to the tool in a particular axis of movement determines the distance which the tool moves in that direction.

Numerically controlled machine tools may have many axes of movement. The pulses supplied to each axis are generated by a pulse generator called an interpolation unit. Position data are supplied to the interpolation unit from a data source which may be a paper tape or a computer memory. The function of the interpolation unit is to generate a series of pulses for each axis of movement. The pulses energize the positioning mechanism which moves the tool or table bed to the desired location. The number of pulses generated at each axis is proportional to the distance it is desired to move the table on that axis and the rate at which the pulses are supplied is proportional to the rate of movement of the table.

One function of the interpolation unit is that of ensuring that pulses generated on one axis which is to move a shorter distance than another axis are equally spaced so that the motion is continuous and follows a straight line to the desired position. To accomplish this, all of the pulses generated on the shorter axis must be spread out so that they occur over the same time interval as the pulses generated in the longer axis.

An interpolator which accomplishes the above may include one register and one accumulator for each axis of motion of the machine tool. All of the registers and accumulators will generally be of the same size. If we assume that each pulse supplied to an axis of the machine tool produces a movement of 0.1 mil and that the tool can operate at a maximum velocity of one inch per second, then the interpolartor must be capable of generating 10,000 pulses per second for each axis. In such a system, each of the forementioned registers and accumulators will generally be of such a size as to handle a number consisting of four decimal digits.

Assume that a 2-dimensional cut is to be made and that the x-axis is to move a distance of .7346 inch while the y-axis moves a distance of .2803 inch. The number 7346 is placed in the register associated with the x-axis of the machine tool, the number 2803 is placed in the register associated with the y-axis of the machine tool and each of the accumulators is set to zero. Then, under control of a single clock within the interpolation unit, the contents of each of the registers is added to its associated accumulator 10,000 times. After the additions are complete, the x-accumulator will have overflowed 7346 times and the y-accumulator will have overflowed 2803 times. The overflow from each accumulator will be used to control the gating of a pulse to the appropriate axis of the machine tool. This will cause the machine tool to cut a piece in a manner that is a very close approximation to a straight line segment having the appropriate slope and distance.

The above brief description points out the reason that a high-speed interpolator is required. If a general purpose computer were to be used as the interpolator for a 2-axis numerically controlled machine, it would have to perform 20,000 additions per second. Since the computer would, at all times, have to keep track of which axis it was working on, how much of the cut had already been made, and various other "housekeeping" functions, it would be reasonable to expect that approximately five or six programming steps would need to be performed for each addition step. This would result in an excess of 100,000 programming steps per second which would need to be performed by the computer. Thus, it can readily be seen that, using the prior art approach, a single general purpose computer could perform interpolations for a very small number of multi-axis numerically controlled machines even if the computer were not being used for any other task.

It is an object of this invention to perform the required interpolation with a high-speed interpolation unit that is smaller and less expensive than those typically used in the prior art.

A more particular object of this invention is to perform the interpolation in such a manner that a portion of it may be done at relatively low speed in a general purpose computer.

SUMMARY OF THE INVENTION

The above objects are accomplished in accordance with one aspect of the invention by dividing the interpolation into two parts. Two registers and two accumulators are used ni the interpolation for each axis of each machine tool. The high order portion of a number which represents the amount of motion that one axis is to move in a given amount of time is repetitively added to itself in a high-speed unit at a first rate which is proportional to the maximum feed rate of the machine tool. The low order portion of the number is repetitively added to itself at a second rate which is lower (generally by a factor of ten or one hundred) than the first rate. Each time that an overflow from the high speed accumulator is detected, a pulse will be generated to cause one increment of motion of the appropriate axis of the machine tool. The number which is added to the high speed accumulator is determined by the presence or absence of an overflow from the low speed accumulator. Each time that an addition into the low speed accumulator does not result in an overflow, the original high order portion of the number representing the distance which the axis is to move will be placed in the register which feeds the high speed accumulator. When an overflow from the low speed accumulator is sensed, a number which is one more than said high order portion will be placed in the register which feeds the high speed accumulator.

The interpolation procedure as outlined above is used for each axis of the machine tool. When the operation being performed involves motion of a plurality of axes, the interpolation will result in a very close approximation to the exact path that is desired. Although the path generated by the interpolation of this invention will differ from the path generated by the prior art interpolation, both paths will be of approximately equal closeness to the predetermined desired path.

A significant advantage of this invention is that it enables a reduction in the size and complexity of the high speed interpolator by reducing the number of digits in the numerical quantities that it must handle. The high-speed interpolator will require less hardware than was heretofore necessary. Another advantage is that this invention will enable a general purpose computer to control, and perform some of the interpolation for, a larger number of numerically controlled machine tools than has heretofore been possible. Still another advantage which results from decreasing the number of digits that are used in the high-speed interpolation is that various interpolation techniques (such as table-lookup) which are not practical if a larger number of digits are involved may now be utilized.

The foregoing and other objects, features and advantages of the invention will be apparent from the following more particular description of preferred embodiments of the invention, as illustrated in the accompanying drawings.

In the drawings:

FIG. 6 is a flow chart illustrating the sequence of operations performed by the interpolation unit of FIG. 5.

ENVIRONMENTAL SYSTEM

Figure 1:
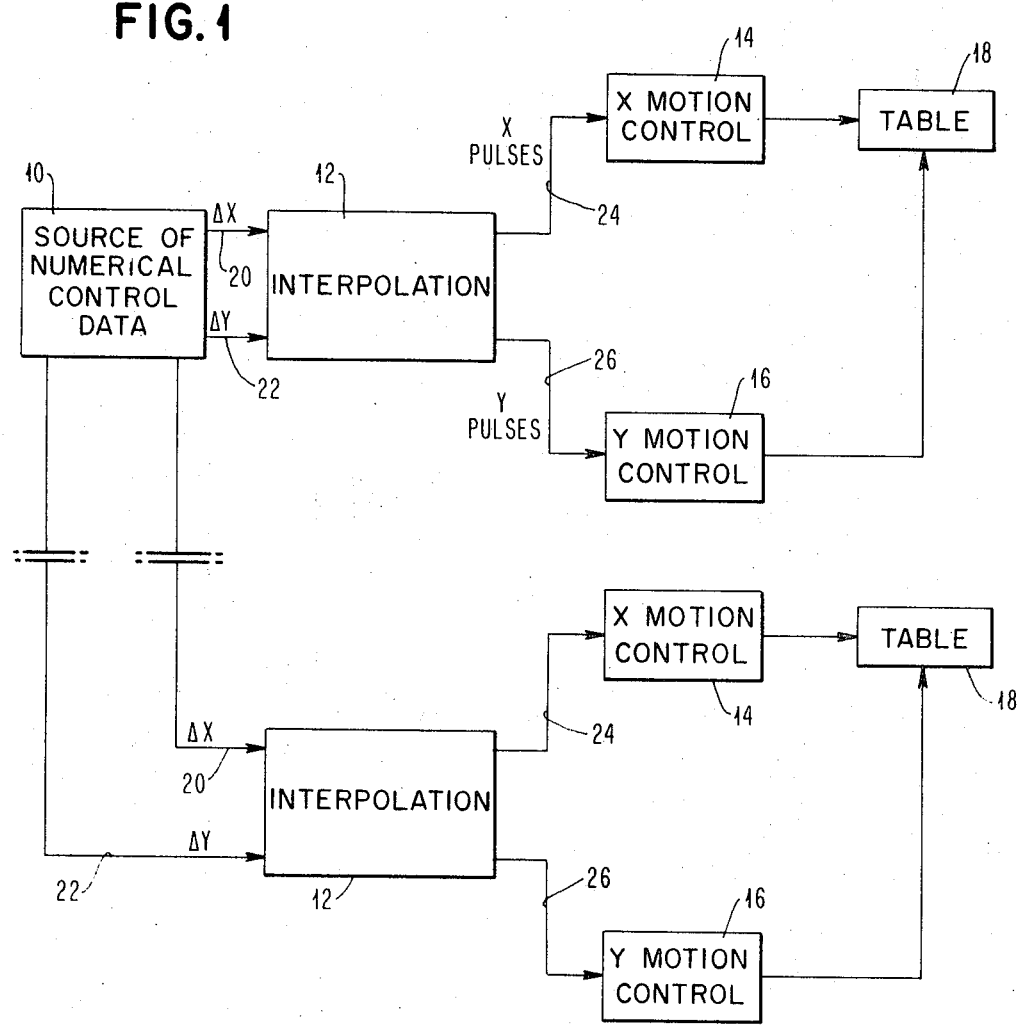
FIG. 1 is a simplified block schematic diagram of a numerical control system of the type in which the invention may be embodied.

Referring to FIG. 1, a numerical control system is comprised of a source of numerical control data 10 which may be a general purpose computer; an interpolation unit 12 for each of the machine tools in the system; $x$-motion control apparatus 14 for each tool; $y$-motion control apparatus 16 for each tool; and one or more tables or machine tools 18 each of which is moved in accordance with the numerical control data.

The apparatus 10 supplies positioning information for the $x$-axis of each machine along output lines 20 and positioning information for the $y$-axis of each machine along output lines 22 to the interpolation units 12. One channel (not shown) of the computer will generally be used as the interface between each interpolation unit and the central processing unit of the computer. Each interpolation unit generates pulses for the $x$-axis on an output line 24 and pulses for the $y$-axis on output line 26. These pulses energize the $x$-motion control and $y$-motion control respectively, which convert the pulses to an analog signal which moves the table an incremental distance for each pulse received.

It will be recognized by those skilled in the art that the schematic diagram of FIG. 1 is a vastly simplified illustration of the basic components of a numerically controlled machine tool system. However, the many details of such a system are now well-known in the art and need not be described in detail herein.

Figure 2:
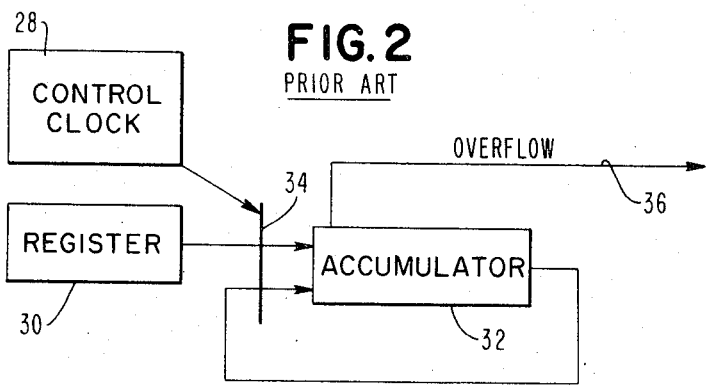
FIG. 2 shows a portion of a prior art interpolator.

FIG. 2 shows certain details of a typical prior art interpolation unit. The unit contains a control clock 28 which furnishes timing pulses. The unit also contains a register 30 and an accumulator 32 for each axis of motion of the machine tool being utilized. Although only a single register and a single accumulator are shown in FIG. 2, it will be understood that an interpolation unit will generally contain a plurality of registers and accumulators, one for each axis of the machine tool. Data are gated to the input of the accumulator through gate 34 under control of the clock pulses from clock 28. The accumulator 32 is the same size as register 30. Each time that the accumulator overflows, a pulse will be generated on line 36.

The operation of this portion of the interpolation unit can easily be explained by considering again the examples referred to in the Introduction to this specification. Assume that the maximum rate of motion of the $x$-axis of the machine tool is 10,000 increments per second. Assume further that it is desired that the $x$-axis of the machine tool move 7346 increments in one second. As was pointed out above, it is desirable that the 7346 increments of motion be spread out as uniformly as possible over the one-second time interval so that this motion may be synchronized with motion along the other axes of the machine tool. In order to achieve this, accumulator 32 is initialized to zero (by means not shown) and the number 7346 is placed in register 30. During the next second, pulses from the control clock 28 will enable gate 34 ten thousand times. Each time that gate 34 is enabled, the contents of register 30 will be added to the contents of accumulator 32 and the sum will be stored in accumulator 32. After 10,000 of these addition cycles, there will have been exactly 7346 overflows from accumulator 32, and this will result in exactly 7346 pulses having been generated on overflow line 36. Also, the spacing of the 7346 pulses within the one-second time interval will have been quite close to being uniform. During the time that the above operation was taking place, a similar interpolation will have been taking place for each of the other axes of the machine tool. Each of other axis-motion interpolations will utilize a separate register and accumulator but their timing will be controlled by the same control clock 28. Thus, despite the fact that each axis will generally move a different amount within a given time increment, the relatively uniform spacing of the pulses within each pulse stream will result in a motion of the machine tool which is very close to the exact path that was desired.

DESCRIPTION OF THE INVENTION

Considering again the numerical example given above, the problem that is solved by the prior art interpolator may be stated as follows: How can 7346 pulses be evenly distributed throughout 10,000 increments of time?

The approach of this invention is as follows: Divide the number 7346 into a high-order portion (7) and a low-order portion (346). If the high-order portion of the number is added to itself 10,000 times, and the result of each addition is stored in a one-digit accumulator, the accumulator will have overflowed exactly 7,000 times. The pattern of overflow pulses will be repetitive in nature, repeating itself after each ten additions. In other words, the stream of 7,000 overflow pulses will consist of 1,000 smaller pulse streams each of which has seven pulses within it. It can easily be seen that the desired stream of 7346 pulses could be constructed by combining streams containing seven pulses and streams containing eight pulses. In this case, it is clear that 346 eight-pulse streams and 654 seven-pulse streams would be required in order to produce the desired 7346 pulses. However, in order to maintain reasonable uniformity of pulse spacing, it will be necessary for the eight-pulse streams to be intermixed in a uniform manner with the seven-pulse streams.

Figure 3:
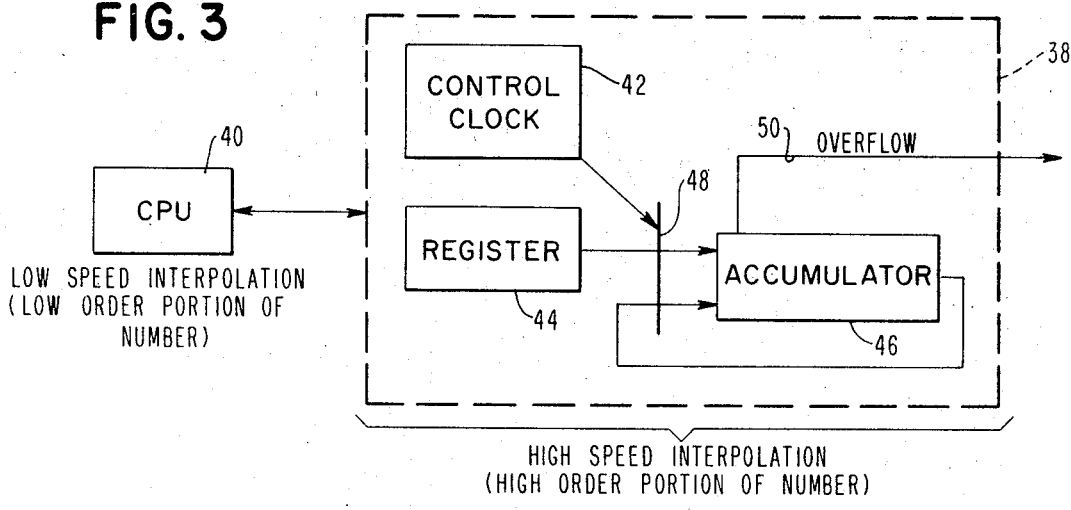
FIG. 3 shows certain details of an interpolator designed in accordance with this invention.

The above may be accomplished in accordance with this invention by using apparatus such as in shown in FIG. 3. As shown in FIG. 3, an interpolation unit 38 is operatively connected to the central processing unit 40 of a computer. As will be understood by those skilled in the art, the interface (not shown) between the interpolation unit and the central processing unit of the computer will generally include a computer channel and a memory medium (such as a core storage unit) which is accessible to both the channel and central processing unit. The interpolator 38 includes a control clock 42 which furnishes timing pulses to all parts of the interpolator. The interpolator also includes a register 44 and an accumulator 46, one of each for each axis of motion of the machine tool being used. The contents of register 44 will be added to the contents of accumulator 46 and the result stored in the accumulator each time that gate 48 is enabled by the control clock 42. Each time that the accumulator overflows, a pulse will be generated on line 50 and fed to the appropriate axis of the machine tool.

For the numerical example example now being considered, register 44 and accumulator 46 are each of such a size as to accommodate one decimal digit. Initially, the digit "7" is placed in register 44. The contents of register 44 will be added to the contents of accumulator 46, and the result stored in accumulator 46, ten thousand times. Each time that accumulator 46 overflows, a signal will be sent to the machine tool on line 50. During the time that 10,000 additions are taking place within the interpolator 38, the low-order portion (346) of the number 7346 will be added to itself 1,000 times within the central processing unit (CPU) 40. The result of each of the low-order additions will be retained in a three-digit field within the CPU and, after each low-order addition, the occurrence or non-occurrence of an overflow will be noted. The first high-speed addition and the first low-speed addition will take place at substantially the same time. Neither of these first additions will result in an accumulator overflow. Then, nine more high-speed additions will take place which, for the case of this numerical example, will result in seven overflows from the high-speed accumulator and seven pulses will be sent to the machine tool to cause motion of the x-axis. By the time that the first ten high-speed additions have taken place, the second low-speed addition will have been made. Again, there will have been no overflow from the low-speed accumulator, so for high-speed additions eleven through twenty, the number "7" will be in register 44. This will result in a second stream of seven pulses being sent to the x-axis of the machine tool to cause seven increments of motion. By the time that the twentieth high-speed addition has been performed, the third low-speed addition will have been performed in the CPU 40. This time, the low-speed addition will have resulted in an overflow. After sensing the overflow, the CPU will generate a signal to the interpolation unit 38 to indicate that for high-speed addition operations twenty-one through thirty, the number "8" is to be placed in register 44. Thus, the third stream of overflow pulses generated on line 50 will contain eight pulses which will cause the x-axis of the machine tool to move eight increments. The fourth low-order addition will not result in an overflow, so the number "7" will again be placed in register 44 for high-speed addition operations thirty-one through forty. Thus, the fourth stream of pulses sent to the machine tool will contain seven pulses. The additions will continue through the remainder of the one-second time interval. At the conclusion of this time interval, one thousand pulse streams will have been sent to the machine tool; six-hundred-fifty-four of the pulse streams will contain seven pulses; three-hundred-forty-six of the pulse streams will contain eight pulses. The eight-pulse streams will have been uniformly intermixed among the seven-pulse streams so that the 7346 pulses will be spaced with reasonable uniformity throughout the time interval.

Figure 4:
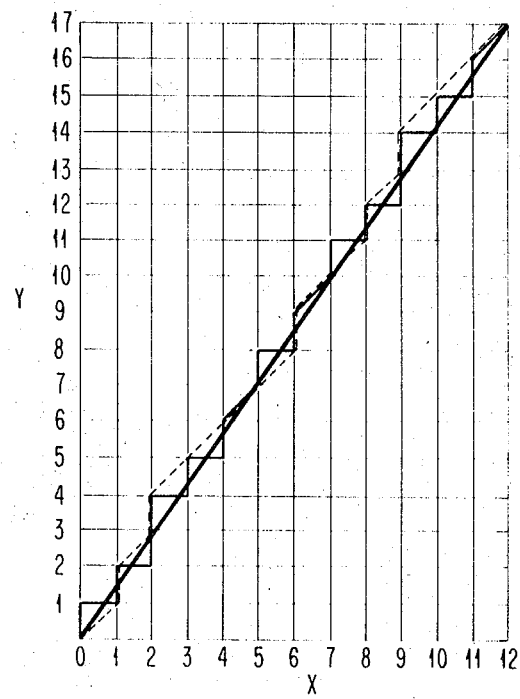
FIG. 4 is a graphic representation of a comparison between the path of movement of a machine tool controlled in accordance with the invention and the path of movement of a machine tool controlled in accordance with the prior art.

For a comparison of the results obtained with this new interpolation with the results obtained by the prior art interpolation, reference is made to FIG. 4. FIG. 4 is a graphic illustration of a segment of a two-dimensional cut made by a machine tool. The cut segment extends twelve units in the x-direction and seventeen units in the y-direction. The heavy straight line of constant slope represents the exact cut that is desired. The light line represents the cut that would be achieved with the prior art interpolation. The dotted line represents the cut that would be achieved by using this invention for interpolation. From a visual inspection of FIG. 4, it is clear that, although the two interpolations will result in different paths of the machine tool, they are substantially equivalent so far as their approximations to the desired straight-line cut are concerned.

It will be recognized by those skilled in the art that when a number is broken into a high-order portion and a low-order portion for interpolation, it is not necessary that only the single high-order digit form the high-order portion of the interpolation. For example, in the case of the number 7346, the interpolation could just as well have been performed by considering the digits "73" as the high-order portion (for high-speed interpolation) and the digits "46" as the low-order portion (for low-speed interpolation). In this case, the register and the accumulator in the interpolation unit would each be two decimal digits in size and the accumulation field within the CPU would also be two digits in size. The digits "73" would be repetitively added in the high-speed interpolation portion, and the digits "46" would be repetitively added in the low-speed interpolation portion, but at one hundredth the speed of the high-speed interpolation. Each time that an overflow occurred in the low-speed accumulator, the number in the high-speed register would be changed to "74." Each time that the low-speed addition did not result in an overflow, the number "73" would be used in the high-speed portion of the interpolation.

Figure 5:
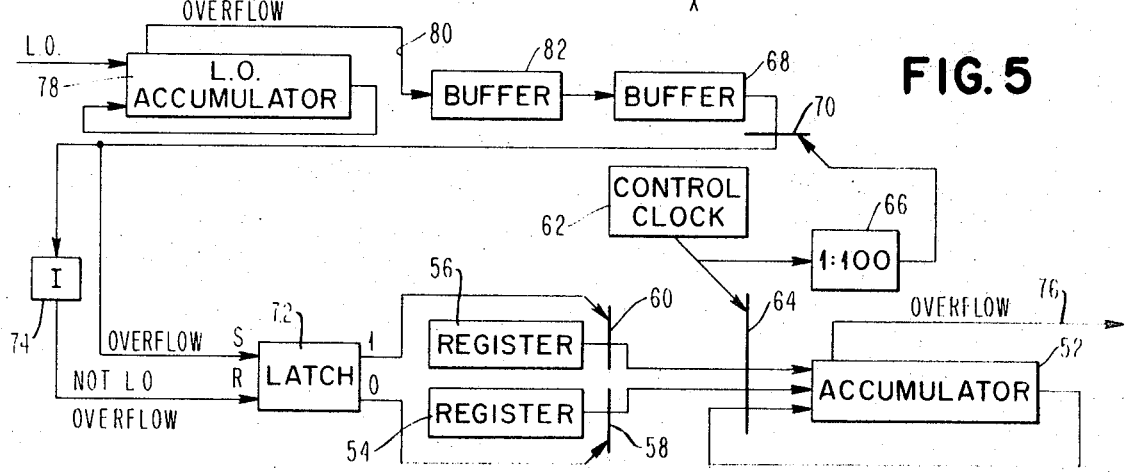
FIG. 5 shows an alternative embodiment of the apparatus shown in FIG. 3.

Referring to FIG. 5, certain details of an alternative embodiment of the invention are shown. The figure shows certain elements of an interpolation unit including an accumulator 52 for high-speed interpolation; two registers 54 and 56 the outputs of which can be gated to the accumulator through gates 58 and 60 respectively; a control clock 62 which controls a gate 64 at the accumulator inputs; a frequency divider 66 which divides the frequency of the control clock pulses by a factor of 100 and which controls the gating of information from buffer 68 through a gate 70; a register selection latch 72 which controls the gating of information from registers 54 and 56 to the accumulator; an inverter 74 which inverts signals received from buffer 68 and feeds them to the reset side of latch 72; and an overflow line 76 upon which a signal is generated each time that an overflow occurs in the accumulator 52. The figure also shows a low-order accumulator 78 with an associated overflow line 80 which sends signals to the buffer 68. Low-order accumulator 78 is preferably a part of the CPU of a general purpose computer (not shown). There also may be provided an auxiliary buffer 82 (one for each axis of motion of the machine tool) which may be used in conjunction with precalculation of low-order overflow data. The auxiliary buffer may be located within the interpolation unit, but it is preferable to locate it within the controlling computer (for example, within the core storage unit of the computer).

The general purpose computer which is controlling the machine tools will have been furnished an input (e.g., paper tape, magnetic tape, punched cards, etc.) which describes the desired motion of the various axes of one or more machine tools. Assume that one of the machine tools is in the process of making a given cut and that the information contained in the controlling computer indicates that the next cut will require motion of the x-axis of 7346 units. In accordance with this invention, 7346 pulses will be generated by high-speed interpolation of the numbers "73" and "74." The CPU will therefore place the numbers 73 and 74 in the four low-order positions of buffer 82. The CPU will then add the number "46" (the low-order portion) into a two-digit field one hundred times. Each time that an overflow occurs, a "1" will be placed in buffer 82; each time that an addition does not result in an overflow, a "0" will be placed in buffer 82. Buffer 82 will be filled, starting at the lowest-order position available after the numbers "73" and "74" have been inserted therein, with a succession of 1's and 0's representing overflow and non-overflow conditions respectively. The CPU will perform a similar operation for *each axis of each machine tool* that is being controlled. Also, it should be noted that this low-speed interpolation will be performed while the machine tools are still operating on previous cuts. When a machine tool has finished a previous cut, it will send an interrupt signal to the controlling computer to cause the contents of buffer 82 to be transferred to buffer 68. This may be accomplished by using standard cycle-steal techniques that are well-known in the art. After the contents of buffer 82 have been transferred to buffer 68, the CPU may begin its low-speed interpolation for the next cut to be made. In the interpolation unit, the first number (73) contained in buffer 68 will be gated to register 54 and the second number (74) contained in buffer 68 will be gated to register 56 utilizing any of a variety of well-known means (not shown). The contents of buffer 68 will be shifted in the low-order direction (to the right) and the first digit which represents a low-order overflow or non-overflow will be gated through gate 70 to latch 72. The first digit will always be a "0" so the output of inverter 74 will reset latch 72. The zero output of latch 72 will enable gate 58. The high-speed interpolation will then commence. Since gate 58 is enabled, the number "73" in register 54 will be repetitively added to itself in accumulator 52 and, after one hundred additions, there will have been seventy-three signals appearing on line 76 to be sent to the x-axis control of the machine tool. After one hundred additions, a pulse from frequency divider 66 will enable gate 70 and the next digit contained in buffer 68 will be shifted out to latch 72. For the numerical example given, this second digit will also be a "0" so the number "73" contained in register 54 will again be added into accumulator 52 one hundred times resulting in another seventy-three pulses being sent to the x-axis control of the machine tool on line 76. After this second stream of pulses has been sent to the machine tool, frequency divider 66 will again enable gate 70 and the third digit contained in buffer 68 will be shifted to latch 72. This digit will be a "1" which will set latch 72 and cause it to enable gate 60 so that for the next one hundred high-speed addition operations the number "74" contained in register 56 will be added to accumulator 52 resulting in a stream of seventy-four pulses being sent to the x-axis control of the machine tool over line 76. This operation will continue until the contents of buffer 68 (and the contents of each of the buffers associated with the other axes of motion of the machine tool) have been exhausted. The interpolation unit will then again interrupt the CPU in order to obtain information for each axis of the machine tool that will be involved in the next cut.

With this invention, a single general purpose computer may control a plurality of multi-axis numerically controlled machine tools by performing calculations at a relatively slow rate. It is also significant that the CPU need not be completely synchronized with the interpolation unit. It is only necessary that transfers between buffers 82 and 68 be inhibited if buffer 82 has not yet been filled when the interpolation unit requests the next block of data. Any of a number of standard techniques for indicating a "ready" or "not ready" condition (such as inserting an extra bit into the buffer) may be used to inhibit such unwanted transfers. In a properly designed system, it is to be expected that such situations would arise very infrequently if at all unless a malfunction had occurred within one of the units of the system.

FIG. 6 is an information flow diagram showing the manner in which data are handled within an interpolation unit such as that shown in FIG. 5. Control data relating to each axis of movement of the machine tool connected to the interpolation unit will be handled in the same manner. For each straight-line cut to be made by a machine tool, data are read into the interpolation unit buffer (step 1) and the high-speed interpolation digits are read into registers within the interpolation unit (step 2). The buffer contents are then shifted one position (step 3) and a bit within the buffer is examined to determine whether or not it indicates a low-order overflow (step 4). If there was a low-order overflow, the register selection latch will be set (step 5); if no low-order overflow is indicated, the register selection latch will be reset (step 6). The contents of the appropriate register will be added to the accumulator of the interpolation unit (step 7). If the addition results in an overflow (step 8), a pulse will be sent to the machine tool (step 9) to cause it to move one increment. Steps 7, 8 and 9 of the flow diagram will be repeated a predetermined number of times (step 10) and then, if the contents of the interpolation unit buffer have not yet been exhausted (step 11), steps 3–10 will be repeated. When the system recognizes that the buffer contents have been exhausted, the next block of data will be read into the interpolation unit buffer (step 1) and the above operations will again be repeated.

Although, in the preferred embodiments of this invention described above, numbers were broken into two portions for interpolation, it will be clear to those skilled in the art that further subdivision may be utilized if desired. For example, in the case of a four-digit number which would be added to itself at a rate of 10,000 additions per second in accordance with the prior art, the number could be divided into four portions in accordance with this invention. Considering again the number 7346, interpolation would then proceed as follows: the lowest order digit ("6") would be repetitively added to a first one-digit accumulator at a rate of ten additions per second; each time that the first accumulator did not overflow, the next lowest-order digit ("4") would be added to a second one-digit accumulator ten times; each time that the first accumulator did overflow, the digit "5" would be added ten times to the second accumulator; each overflow from the second accumulator would cause the digit "4" to be added to a third one-digit accumulator ten times and each time that the second accumulator did not overflow, the digit "3" would be added to the third accumulator ten times; each time that the third accumulator overflowed, the digit "8" would be added to a fourth one-digit accumulator ten times, and each time that the third accumulator did not overflow, the digit "7" would be added to said fourth accumulator ten times. Thus, there would be a separate accumulator associated with each of the digits (7, 3, 4, 6) of the number to be interpolated and each accumulator would be performing addition operations at a different rate; 10,000, 1,000, 100 and 10 additions per second respectively. It will be clear to those skilled in the art that, particularly in the case where the number to be interpolated is broken into more than two portions, more than one part of the total interpolation may be performed within the special-purpose interpolation unit, or a series of two or more special-purpose interpolation units may be utilized.

When this invention is used to control a plurality of numerically controlled machine tools, the controlling general purpose computer need not assume the same interpolation burden for each machine tool. For example, in a system where a single controlling computer will at various times control one, two or three machine tools, the capabilities of the controlling computer might make it desirable to implement the system in such a manner that the controlling computer performs the low-order interpolation for the three lowest-order digits of data associated with machine tool number one while, for machine tools two and three, the controlling computer performs the low-order interpolation for only the two lowest-order digits of data associated with these machine tools. This could be desirable in a case where the capabilities of the controlling computer are such that it could not keep three machine tools going at maximum speed if it performed low-order interpolation for the lowest-order three digits of the data for each machine tool.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a numerically controlled machine system which comprises a source of numerical control data, a computer central processing unit, data interpolation means operatively connected to said central processing unit, and numerically controlled positioning means operatively connected to said interpolation means so as to move in response to pulses received from said interpolation means; means for generating a stream of $n$ substantially uniformly time-spaced pulses comprising:
   first means within said interpolation means for generating successive substreams of substantially uniformly time-spaced pulses, each of said substreams containing fewer than $n$ pulses and being a predetermined function of the high-order portion of the number $n$;
   said central processing unit generating a sequence of signals that is a predetermined function of the low-order portion of the number $n$;
   means interconnected between said central processing unit and said interpolation means for transmitting said sequence of signals to said interpolation means;
   said first means being responsive to said sequence of signals to vary the number of pulses in selected ones of said substreams.

2. The apparatus of claim 1 wherein:
   said first means comprises means for interpolating in a predetermined manner at a first rate the high-order portion of the number $n$; and
   said sequence of signals is generated by interpolating in said predetermined manner at a second rate which is slower than said first rate the low-order portion of the number $n$.

3. The apparatus of claim 1 wherein:
   said first means comprises;
      an accumulator of sufficient capacity to hold the high-order portion of the number $n$, register means for adding said high-order portion to said accumulator at a first rate, and overflow sensing means for generating said substreams in response to arithmetic overflows from said accumulator; and
   said sequence of signals is indicative of overflow which would result from repetitively adding the low-order portion of the number $n$ to an accumulator of sufficient capacity to hold said low-order portion;
   the contents of said register means being determined jointly by said high-order portion and said sequence of signals.

4. A numerically controlled machine system comprising a source of motion control data, pulse generating means responsive to said data for generating a number of control pulses which represent said data, and positioning means moving in response to said control pulses; said pulse generating means comprising:
   low-speed interpolating means responsive to a first portion of said motion control data for generating a series of signals in a predetermined manner from said first portion;
   high-speed interpolating means;
   means interconnected between said low-speed interpolating means and said high-speed interpolating means for transmitting said series of signals to said high-speed interpolating means;
   said high-speed interpolating means being jointly responsive to said series of signals and to a second portion of said motion control data for generating said control pules.

5. A numerically controlled machine system comprising: a source of numerical data representing the desired motion of a machine, said numerical data comprising numbers having a high-order portion and a low-order portion; pulse generating means operatively connected to said source and responsive to each of said numbers for generating a stream of substantially uniformly time-spaced pulses representative of each of said numbers; and pulse responsive positioning means operatively connected to said pulse generating means and responsive to each one of said streams of pulses for moving a distance that bears a predetermined relationship to the number of pulses in said stream; said pulse generating means comprising:
   low-speed interpolating means responsive to the low-order portion of one of said numbers for manifesting a series of signals, said series of signals having been generated by repetitively adding said low-order portion to an accumulator, each addition which did not result in an accumulator over-flow producing a signal of a first type and each addition which did result in an accumulator overflow producing a signal of a second type;
   high-speed interpolating means;
   interconnecting means connected between said low-speed interpolating means and said high-speed interpolating means for transmitting said series of signals to said high-speed interpolating means;
   said high-speed interpolating means being responsive to signals of said first type for generating a series of pulses equal in number to the high-order portion of said one of said numbers;
   said high-speed interpolating means being responsive to signals of said second type for generating a series of pulses equal in number to one more than said high-order portion.

6. The apparatus of claim 5 wherein said interconnecting means comprises:
   buffer storage means for storing said series of signals; and
   gating means for serially gating the signals in said series of signals to said high-speed interpolating means.

7. A numerically controlled machine system comprising: a source of numerical data representing the desired motion of a machine, said numerical data comprising numbers having a high-order portion and a low-order portion: pulse generating means operatively connected to said source and responsive to each of said numbers for generating a stream of substantially uniformly time-spaced pulses representative of each of said numbers: and pulse responsive positioning means operatively connected to said pulse generating means and responsive to each one of said streams of pulses for moving a distance that bears a predetermined relationship to the number of pulses in said stream: said pulse generating means comprising:
   low-speed interpolating means comprising a first accumulator and being responsive to the low-order portion of one of said numbers for generating a series of signals by repetitively adding said low-order portion to said first accumulator, each addition which did not result in an accumulator overflow producing a signal of a first type and each addition which did result in an accumulator overflow producing a signal of a second type;
   buffer storage means connected to said low-speed interpolation means for storing said series of signals;
   output gating means connected to the output of said buffer storage means for transmitting one of said signals each time that said output gating means is enabled;

signal indicating means connected to said output gating means so as to receive a signal from said buffer, said signal indicating means having a first output for indicating receipt of a signal of said first type and a second output for indicating receipt of a signal of said second type;

high-speed interpolating means comprising:
  a first register and a second register,
  a second accumulator having an input and an overflow indicating output, first gating means connected to the input of said second accumulator,
  second gating means connecting the output of said first register to said first gating means,
  third gating means connecting the output of said second register to said first gating means, and
  a source of timing signals connected to said first gating means for causing the contents of one of said registers to be added to said second accumulator at a first rate;

frequency dividing means connected between said source of timing signals and said output gating means so as to enable said output gating means at a second rate which is less than said first rate;

said first output of said signal indicating means being connected to said second gating means to enable same when a signal of said first type is received from said buffer storage means;

said second output of said signal indicating means being connected to said third gating means to enable same when a signal of said second type is received from said buffer storage means;

means connected between said source of data and said first register for transmitting a value equal to the high-order portion of said one of said numbers to said first register; and means interconnected between said source of data and said second register for transmitting a value equal to one greater than said last-mentioned high-order portion to said second register;

whereby said second accumulator will generate on its overflow output a stream of substantially equally time-spaced pulses, said stream containing a number of pulses equal to said one of said numbers.

References Cited
UNITED STATES PATENTS

| | | | |
|---|---|---|---|
| 3,372,268 | 3/1968 | Hoernes | 235—151.11 |
| 3,411,094 | 11/1968 | Martinek | 235—151.11X |
| 3,417,303 | 12/1968 | Reuteler | 235—151.11X |

MALCOLM A. MORRISON, Primary Examiner

R. S. DILDINE, Jr., Assistant Examiner

U.S. Cl. X.R.

83—71